United States Patent

Berman (10) Patent No.: US 11,922,452 B2
(45) Date of Patent: Mar. 5, 2024

(54) SYSTEM FOR MANAGING A LOYALTY PROGRAM MARKETPLACE

(71) Applicant: PAYPAL, INC., San Jose, CA (US)

(72) Inventor: Zachary Joseph Berman, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/461,822

(22) Filed: Aug. 30, 2021

(65) Prior Publication Data

US 2021/0390575 A1 Dec. 16, 2021

Related U.S. Application Data

(63) Continuation of application No. 15/851,106, filed on Dec. 21, 2017, now Pat. No. 11,120,464.

(51) Int. Cl.
*G06Q 30/0226* (2023.01)
*G06Q 20/32* (2012.01)
*G06Q 20/38* (2012.01)

(52) U.S. Cl.
CPC ..... *G06Q 30/0233* (2013.01); *G06Q 20/3224* (2013.01); *G06Q 20/3821* (2013.01)

(58) Field of Classification Search
None
See application file for complete search history.

(56) References Cited

U.S. PATENT DOCUMENTS

| | | | | |
|---|---|---|---|---|
| 2001/0054006 A1* | 12/2001 | Lee | ......... | G06Q 40/04 705/37 |
| 2002/0062249 A1* | 5/2002 | Iannacci | ......... | G06Q 30/06 705/14.1 |
| 2003/0088509 A1 | 5/2003 | Wilton et al. | | |
| 2011/0004558 A1* | 1/2011 | MacLean | ......... | G06Q 50/188 705/80 |
| 2012/0004968 A1* | 1/2012 | Satyavolu | ......... | H04M 15/84 705/14.25 |

(Continued)

OTHER PUBLICATIONS

Alharby et al., "Blockchain-based Smart Contracts: A Systematic Mapping Study", Fourth International Conference on Computer Science and Information Technology (CSIT-2017), arXiv:1710.06372 [cs.CR]. (Year: 2017).*

(Continued)

*Primary Examiner* — Christopher B Tokarczyk
(74) *Attorney, Agent, or Firm* — Haynes and Boone, LLP (57) ABSTRACT

A computer system detects a request to process a transaction corresponding to a first user and a first merchant, wherein the first user is associated with a first user account of a plurality of user accounts associated with a transaction platform. In response to detecting the request to process the transaction, the computer system identifies that a second user account of the plurality of user accounts includes a first amount of rewards corresponding to the first merchant. The computer system determines an optimal transaction path for obtaining, from the second user account, at least a portion of the first amount of rewards. In response to determining the optimal transaction path, the computer system utilizes the optimal transaction path to obtain the at least the portion of the first amount of rewards, and processes the transaction by utilizing the at least the portion of the first amount of rewards.

20 Claims, 6 Drawing Sheets

(56) References Cited

U.S. PATENT DOCUMENTS

| | | | |
|---|---|---|---|
| 2012/0005036 A1* | 1/2012 | Erickson | G06Q 30/00 705/26.2 |
| 2012/0035998 A1* | 2/2012 | Chien | G06Q 30/0267 705/14.17 |
| 2014/0222542 A1* | 8/2014 | Postrel | G06Q 30/0226 705/14.29 |
| 2017/0140408 A1* | 5/2017 | Wuehler | G06Q 30/0207 |
| 2017/0323323 A1* | 11/2017 | Postrel | G06Q 30/0209 |

OTHER PUBLICATIONS

Nevmyvaka Y., et al., "Reinforcement Learning for Optimized Trade Execution," Proceedings of the 23rd International Conference on Machine Learning, Pittsburgh, PA, 2006, 8 pages.

* cited by examiner

SYSTEM FOR MANAGING A LOYALTY PROGRAM MARKETPLACE

CROSS-REFERENCE TO RELATED APPLICATIONS

This application is a continuation of U.S. patent application Ser. No. 15/851,106, filed Dec. 21, 2017, which is incorporated by reference in its entirety.

TECHNICAL FIELD

The present disclosure relates to loyalty programs, and more particularly to a system for managing a loyalty program marketplace.

BACKGROUND

In today's day and age, it is quite common for merchants and stores to offer loyalty programs to their customers or to potential customers. These loyalty programs incentivize customers to spend more money at the merchant location by offering rewards in return for certain amounts of customer expenditure. However, loyalty rewards typically only have value for a particular store or set of stores, therefore, in some cases loyalty rewards can unused or expired. These lost rewards could potentially be salvaged if a solution existed that allowed loyalty points to be utilized outside of the bounds of the corresponding merchant stores.

DETAILED DESCRIPTION

Embodiments of the present disclosure provide a system, method, and program product. A computer system detects a request to process a transaction corresponding to a first user and a first merchant, wherein the first user is associated with a first user account of a plurality of user accounts associated with a transaction platform. In response to detecting the request to process the transaction corresponding to the first user and the first merchant, the computer system identifies that a second user account of the plurality of user accounts includes a first amount of rewards corresponding to the first merchant. The computer system determines an optimal transaction path for obtaining, from the second user account, at least a portion of the first amount of rewards corresponding to the first merchant. In response to determining the optimal transaction path for obtaining, from the second user account, the at least the portion of the first amount of rewards corresponding to the first merchant, the computer system utilizes the optimal transaction path to obtain the at least the portion of the first amount of rewards corresponding to the first merchant and processing the transaction by utilizing the at least the portion of the first amount of rewards corresponding to the first merchant.

In the example embodiment, the present disclosure describes a solution that detects a request to process a transaction with a merchant. Further, the present solution describes determining whether another user of a transaction application has an amount of rewards corresponding to the merchant. In response to determining that there is another user on the transaction application that has an amount of rewards corresponding to the merchant, the present solution describes determining a transaction path for obtaining the amount of rewards from the other user. The present solutions further describes utilizing the determined transaction path to obtain the rewards, for example, by identifying a type of rewards or monetary compensation the other user would accept in exchange for the amount of rewards. The present solution then describes utilizing the obtained amount of rewards to process and complete the transaction with the merchant.

The present solution describes an improvement to current technology because, based on a detected transaction, reward points may be obtained for use in a transaction, which may in certain cases result in a user paying a lower amount for an item. Furthermore, a user's rewards points may be exchanged based on a detection that the user is in a certain location or visits a certain location (such as a merchant location) frequently. Therefore, the present solution offers a dynamic rewards exchange where a user's rewards may correspond more closely with actual spending habits. Furthermore, in one or more embodiments, the users of the transaction application may be given the choice to "opt in", in order to participate in rewards exchanges.

In addition, the present solution describes a solution for aggregating transactions with a merchant and further identifying when to write the transactions to a blockchain. In the example embodiment, the present solution describes receiving transaction information and aggregating the transaction with previous transactions. The present solution then describes determining whether the aggregated transactions satisfy a set of requirements, and if so, the present solution describes identifying and communicating with an appropriate smart contract with regard to the aggregated transactions. In this example embodiment, the described communication may cause the smart contract to determine an amount of rewards or points to allocate to a user account (based on the aggregated transactions), and further cause the transaction details to be written on to the appropriate blockchain.

Embodiments of the present disclosure will now be described in detail with reference to the accompanying Figures.

Figure 1:
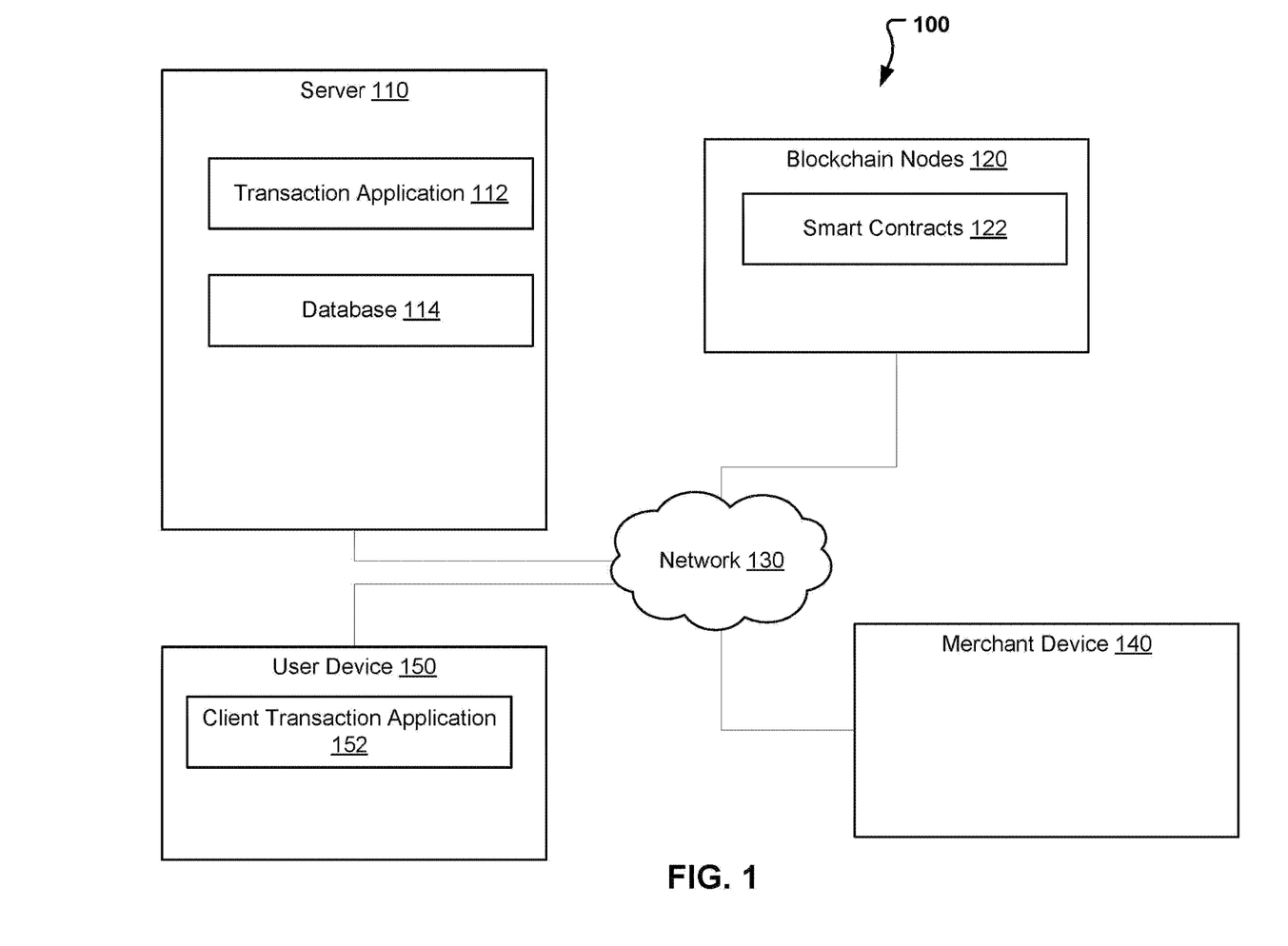
FIG. 1 illustrates a loyalty marketplace system, in accordance with an embodiment.

FIG. 1 illustrates loyalty marketplace system 100, in accordance with an embodiment. In the example embodiment, loyalty marketplace system 100 includes server 110, blockchain nodes, user device 150, and merchant device 140 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a Bluetooth, a local area network (LAN), or a wide area network (WAN). In general, network 130 can be any combination of connections and protocols that will support communications between computing devices, such as between server 110 and blockchain nodes 120.

In the example embodiment, merchant device 140 is a merchant point of sale (POS) device. Furthermore, in the example embodiment, merchant device 140 may be a desktop computer, a laptop computer, a tablet computer, a mobile device, a handheld device, a thin client, or any other electronic device or computing system capable of receiving and sending data to and from other computing devices, such as server 110, via network 130. Although not shown, optionally, merchant device 140 can comprise a cluster of servers executing the same software to collectively process requests as distributed by a front-end server and a load balancer. Merchant device 140 is described in more detail with reference to FIG. 6.

Blockchain nodes 120 includes smart contracts 122. In the example embodiment, blockchain nodes 120 may include one or more computing devices (nodes) that store information corresponding to one or more blockchains. In the example embodiment, each node of blockchain nodes 120 may be a desktop computer, a laptop computer, a tablet computer, a mobile device, a handheld device, a thin client, or any other electronic device or computing system capable of receiving and sending data to and from other computing devices, such as server 110, via network 130. Blockchain nodes 120 is described in more detail with reference to FIGS. 5 and 6.

Smart contracts 122 include one or more smart contracts located on the blockchain that may govern the allocation of rewards points for one or more users of one or more merchants. In the example embodiment, each smart contract of smart contracts 122 may correspond to a specific merchant and a specific user, however, in other embodiments, each smart contract of smart contracts 122 may corresponding to one or more users and a specific merchant, or a specific user and one or more merchants. Smart contracts 122 is described in more detail with reference to FIGS. 2 through 4.

In the example embodiment, user device 150 includes client transaction application 152. Furthermore, in the example embodiment, user device 150 may be a mobile device, however, in other embodiments, user device 150 may be a desktop computer, a laptop computer, a tablet computer, a handheld device, a thin client, or any other electronic device or computing system capable of receiving and sending data to and from other computing devices, such as server 110, via network 130. Although not shown, optionally, user device 150 can comprise a cluster of servers executing the same software to collectively process requests as distributed by a front-end server and a load balancer. User device 150 is described in more detail with reference to FIG. 6.

Client transaction application 152 is a client side application that may be utilized to communicate with a corresponding server side application, such as transaction application 112. Furthermore, in the example embodiment, client transaction application 152 may be utilized to communicate with a merchant point of sale (POS) device, such as merchant device 140, in order to perform a transaction. Client transaction application 152 is described in more detail with reference to FIG. 2 through 4.

Server 110 includes transaction application 112 and database 114. In the example embodiment, server 110 may be a desktop computer, a laptop computer, a tablet computer, a handheld device, a smartphone, a thin client, or any other electronic device or computing system capable of receiving and sending data to and from other computing devices, such as merchant device 140, via network 130. Server 110 is described in more detail with reference to FIG. 6.

In the example embodiment, database 114 is a database that includes information corresponding to one or more users of transaction application 112. For example, database 114 may include user account information, transaction information, authorization information, and further may include user preference information. Database 114 is described in further detail with regard to FIGS. 2 through 4.

In the example embodiment, transaction application 112 is a software application that is capable of receiving transaction information from other computing devices, such as user device 150 and merchant device 140, and further capable of processing transactions based on the received transaction information. Furthermore, in the example embodiment, transaction application 112 is a server-side transaction application that is capable of communicating with one or more client applications, such as client transaction application 152. In addition, transaction application 112 is capable of identifying user preferences associated with a transaction and determining a payment option to utilize when processing the transaction. Furthermore, transaction application 112 is capable of serving as a platform for buying, selling, and exchanging rewards points. In addition, based on the preferred payment option of a user, transaction application 112 is capable of communicating with blockchain nodes 120 and identifying whether an amount of rewards for a specific merchant is available, and if available, identifying a transaction path for obtaining the rewards. Transaction application 112 is described in more detail with regard to FIGS. 2 through 4.

Figure 2:
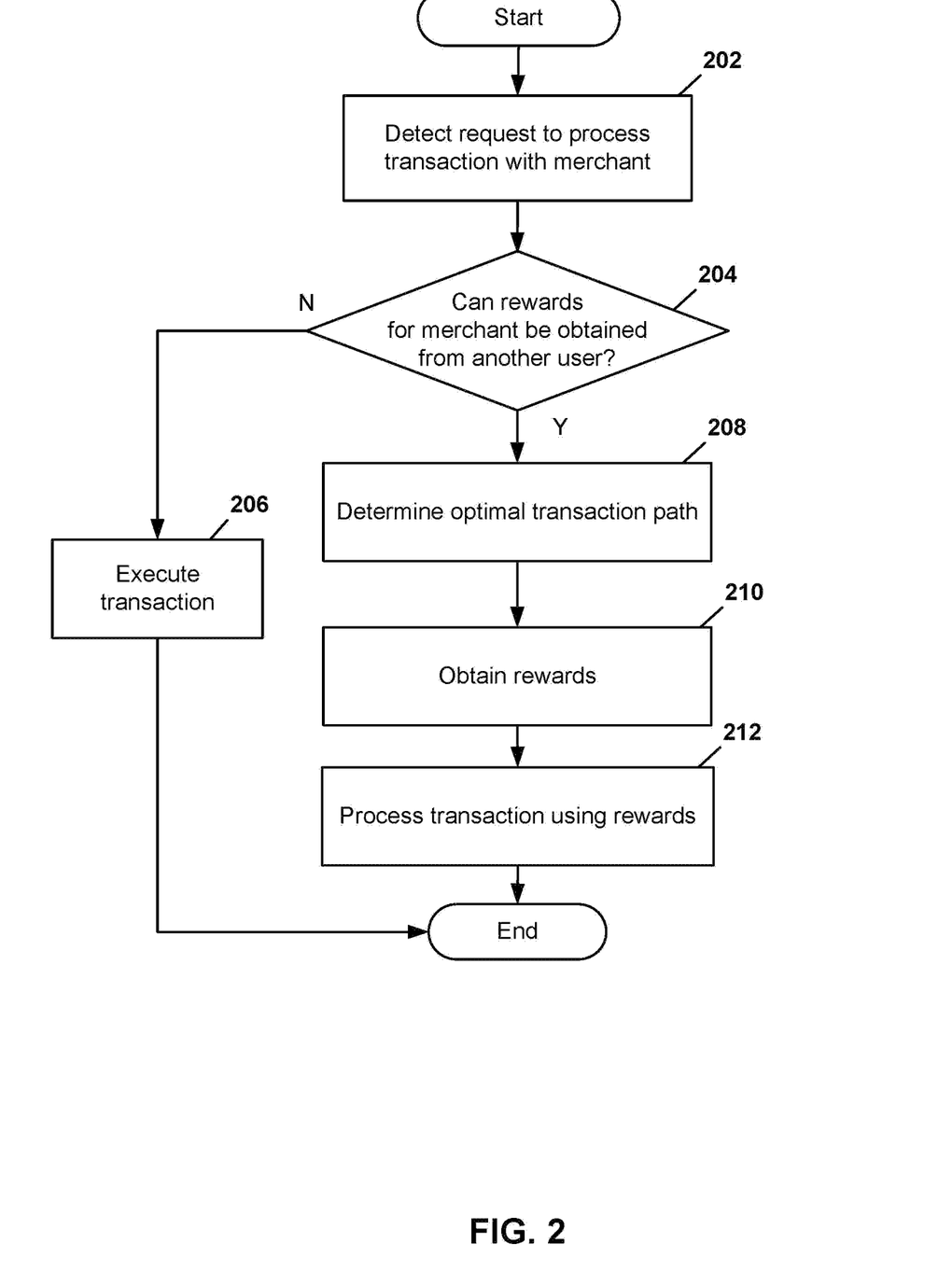
FIG. 2 is a flowchart illustrating the operations of the server-side transaction application of FIG. 1 in identifying whether an amount of rewards for a specific merchant are available, and if so, determining a transaction path for obtaining the rewards, in accordance with an embodiment.

FIG. 2 is a flowchart illustrating the operations of the transaction application 112 in identifying whether an amount of rewards for a specific merchant are available, and if so, determining a transaction path for obtaining the rewards, in accordance with an embodiment.

In the example embodiment, transaction application 112 detects a request to process a transaction with a merchant (step 202). In the example embodiment, transaction application 112 receives a request to process a transaction from merchant device 140. For example, the user of user device 150 may utilize client transaction application 152 to initiate a transaction at a merchant POS, such as merchant device 140. For example, the transaction may be initiated by user device 150 communicating with merchant device 140 by way of near field communication (NFC), and further with merchant device 140 transmitting a request, to server 110, to process a transaction using the user information received from user device 150. In other embodiments, the transaction may be initiated online. In addition, in further embodiments, transaction application 112 may receive the transaction request from user device 150 rather than a merchant device or merchant POS.

Upon detection of the request, transaction application 112 may reference database 114 in order to authenticate the user information received in the request, and identify the account associated with the user of user device 150. Furthermore, transaction application 112 may identify a payment preference associated with the account. For example, a "rewards marketplace" payment option may be the selected payment preference of user device 150. In the example embodiment, the "rewards marketplace" may include rewards information pertaining to one or more users, with the rewards information contained on one or more blockchain (such as on blockchain nodes 120). In other embodiments, "the rewards marketplace" may include rewards information pertaining to one or more users, with the rewards information stored on another storage medium, such as a database or one or more servers, and accessible via network 130.

If the "rewards marketplace" option is the preferred option for a transacting user, transaction application 112 may determine if rewards (such as points) specific to the merchant associated with the transaction can be obtained from another user of transaction application 112 (decision 204). In the example embodiment (where rewards information is stored on one or more blockchains), transaction application 112 may reference rewards information contained on the appropriate blockchain and identify whether another user of transaction application 112 has rewards specific to the merchant associated with his/her account. In other embodiments (where rewards information is not stored on a blockchain), transaction application 112 may access the appropriate storage device(s) to identify whether another user of transaction application 112 has rewards specific to the merchant associated with his/her account. Furthermore, if transaction application 112 determines that another user of transaction application 112 has rewards specific to the merchant associated with the transaction, transaction application 112 may further check preference information in database 114 to determine preferences associated with the account of the other user in order to determine whether the other user is willing to exchange or sell the specific rewards.

If transaction application 112 determines that rewards specific to the merchant associated with the transaction cannot be obtained from an account of another user of transaction application 112 (decision 204, "NO" branch), transaction application 112 may utilize another payment method to execute the transaction (step 206).

If transaction application 112 determines that rewards specific to the merchant associated with the transaction can be obtained from an account of another user of transaction application 112 (decision 204, "YES" branch), transaction application 112 determines the optimal transaction path for obtaining the rewards (step 208). In the example embodiment, determining the optimal transaction path may include referencing database 114 to determining exchange or sell preferences associated with the account of the other user. For example, the preferences may state that the other user is willing to exchange rewards specific to the merchant associated with the transaction for rewards for a second merchant. Each reward may have an associated value that is determined by transaction application 112 that may change dynamically based on a number of factors such as the expiration date of the rewards (a value of a reward may dip lower as the expiration date nears), and based on supply and demand. Furthermore, the value of each respective reward may be determined dynamically based on location information and device usage information of the opted in users. Device usage information may include current usage of a device, such as tracking that a user is currently visiting a merchant website (or used a merchant application), and may also include past usage of a device, such as tracking that a user has recently visited a merchant website (or used a merchant application). In the example embodiment, location information and device usage information may be tracked for all users of transaction application 112 that have opted in to participate in rewards exchanges.

For example, if a higher than a threshold amount of users are identified as being currently in a location associated with a first merchant and/or currently visiting a webpage/application associated with a first merchant, transaction application 112 may increase the price or exchange value for rewards associated with the first merchant based on an increased potential demand. In addition, preferences associated with a user may state that a user is willing to exchange or sell rewards for a specific merchant based on the price or exchange value being at or above a certain level. In the example embodiment, in determining a transaction path, transaction application 112 may determine reference preferences associated with one or more users that have the desired rewards, and determine which of the one or more users represents the optimal transaction path. For example, a first user may be willing to sell the desired rewards for a lower price than a second user, and therefore, transaction application 112 may determine that transacting with the first user is the optimal transaction path. In another example, a first user may be willing to exchange the desired rewards for an amount of rewards corresponding to a first merchant, while a second user is willing to exchange the desired rewards for an amount of rewards corresponding to a second merchant. If the preferences associated with the account of the user of user device 150 values rewards corresponding to the first merchant at a higher level than rewards corresponding to the second merchant, transaction application 112 may determine that transacting with the second user is the optimal transaction path.

In a further example, if a first user is willing the exchange the desired rewards for an amount of rewards corresponding to a first merchant, however, the user of user device 150 only has rewards corresponding to a second merchant, transaction application 112 may identify a second user to include in the transaction path that has rewards corresponding to the first merchant and desires rewards corresponding to a second merchant in return. In addition, in this further example, transaction application 112 may take the acceptable exchange values corresponding to each user's rewards into account in determining the optimal transaction path. For example, if a third user is willing to exchange rewards corresponding to the first merchant at a lower rate than the second user described above, transaction application 112 may include the third user in the transaction path in place of the second user. Furthermore, the length and complexity of the transaction path may be taken into account as well. For example, if a first transaction path included the user of user device 150 transacting with a first user and a second user to obtain the desired rewards, and a second transaction path includes the user of user device 150 transacting with a first user, a second user, and a third user to obtain the desired rewards, transaction application 112 may determine that the first transaction path is the optimal transaction path.

Once an optimal transaction path is determined by transaction application 112, transaction application 112 obtains the desired rewards (rewards corresponding to the merchant associated with the transaction) in accordance to the determined optimal transaction path (step 210). In the example embodiment, transaction application 112 may complete the transaction utilizing the blockchain (with the blockchain being updated to reflect the transaction or transactions).

In the example embodiment, transaction application 112 processes the transaction using the obtained rewards corresponding to the merchant associated with the transaction (step 212). Furthermore, in the example embodiment, transaction application 112 may determine if there is a leftover balance after the rewards have been applied towards the purchase, and if so, transaction application 112 may utilize another payment method associated with the account of the user of user device 150 to complete the transaction.

Figure 3:
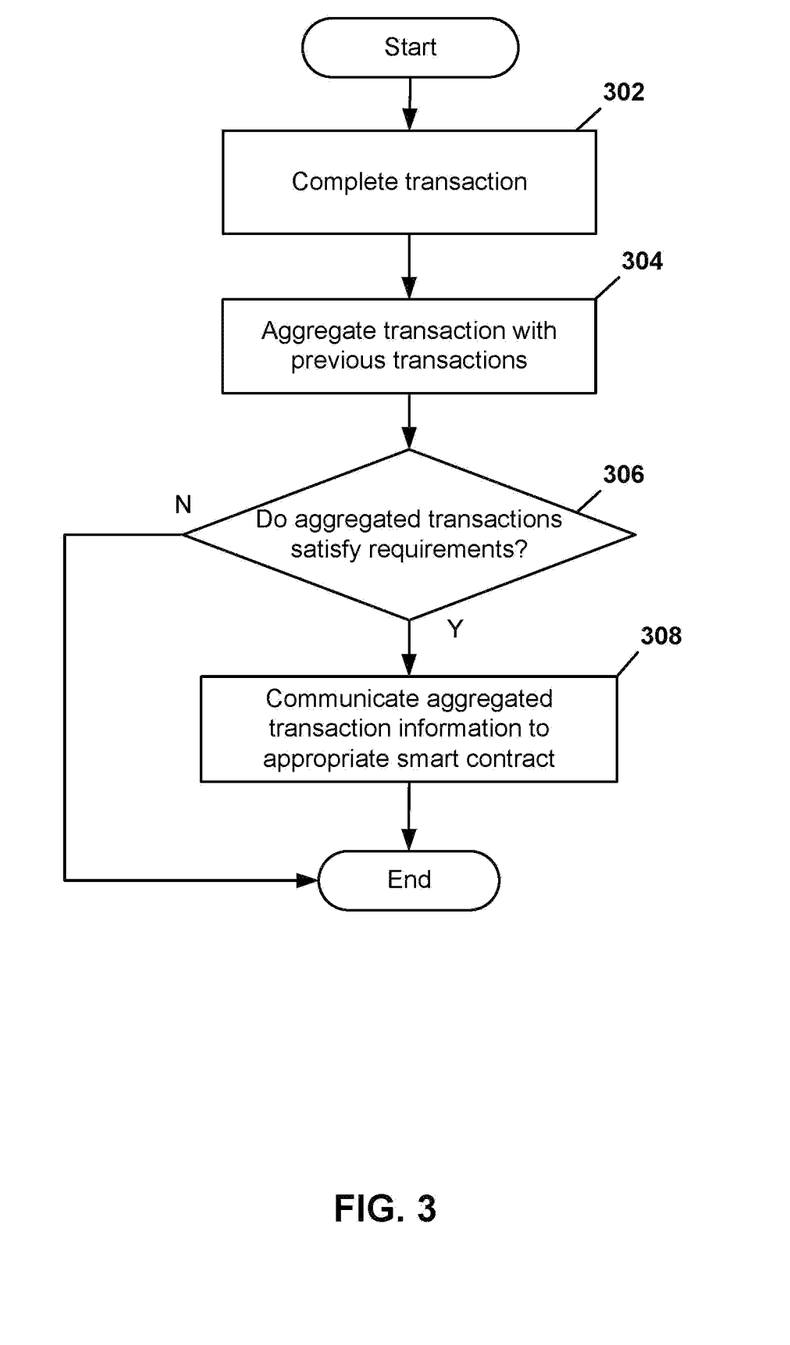
FIG. 3 is a flowchart illustrating the operations of the server-side transaction application of FIG. 1 in aggregating transaction information and based on determining whether a set of requirements are satisfied, causing rewards information on a blockchain to be updated, in accordance with an embodiment.

FIG. 3 is a flowchart illustrating the operations of transaction application 112 in aggregating transaction information and based on determining whether a set of requirements are satisfied, causing rewards information on a blockchain to be updated, in accordance with an embodiment. In the example embodiment, transaction application 112 processes a transaction utilizing information received from a user device, such as user device 150, or a merchant device, such as merchant device 140 (step 302).

In the example embodiment, transaction application 112 aggregates the processed transaction with information corresponding to one or more previously processed transactions (step 304). In the example embodiment, transaction application 112 may identify the merchant associated with the processed transaction and then aggregate the transaction only with previously processed transactions that correspond to the merchant. Furthermore, in the example embodiment, the processed transaction is only aggregated with previously processed transactions that have not been written to the blockchain (or been processed for rewards points allocation).

In the example embodiment, transaction application 112 determines if the aggregated transactions satisfy one or more requirements (decision 306). In the example embodiment, the one or more requirements may include a threshold dollar amount, an amount of time, a number of transactions, or a similar transactional requirement. For example, transaction application 112 may determine that the aggregated transactions satisfy the one or more requirements if: 1) a transactional amount associated with the aggregated transactions exceeds a threshold dollar amount; 2) an amount of time that has passed since the earliest transaction of the aggregated transactions was processed exceeds a threshold amount of time; or 3) the number of transactions associated with the aggregated transactions exceeds a threshold amount of transactions.

If transaction application 112 determines that the aggregated transactions do not satisfy the one or more requirements (decision 306, "NO" branch), transaction application 112 continues to aggregate transaction associated with the merchant with the already aggregated transactions. If transaction application 112 determines that the aggregated transactions do satisfy the one or more requirements (decision 306, "YES" branch), transaction application 112 communicates the aggregated transactions to the appropriate smart contract of smart contracts 122, and further causes an amount of rewards points to be allocated based on one or more factors associated with the aggregated transactions (step 308). In the example embodiment, each smart contract of smart contracts 122 may correspond to a specific merchant and further to each specific user. Therefore, transaction application 112 may identify the specific smart contract of smart contracts 122 that corresponds to the user of user device 150 and to the merchant associated with the aggregated transactions. In other embodiments, as stated above, a smart contract of smart contracts 122 may correspond to a specific merchant and a group of users. In further embodiments, a smart contract of smart contracts 122 may correspond to multiple users and either a single user (or a group of users).

In the example embodiment, the smart contract contains logic that identifies an amount of rewards to allocate to a user based on certain criteria such as transactional amount, transactional volume, amount of time spent at merchant locations, frequency of purchases, time periods associated with purchases, and additional factors. Transaction application 112 may utilize user information and merchant information to identify the appropriate smart contract, and upon communicating the aggregated transaction information to the appropriate smart contract, the smart contract may cause the rewards to be allocated to an account associated with the user of user device 150. Furthermore, the transaction information and/or allocated rewards may be written onto the blockchain (blockchain nodes 120).

Figure 4:
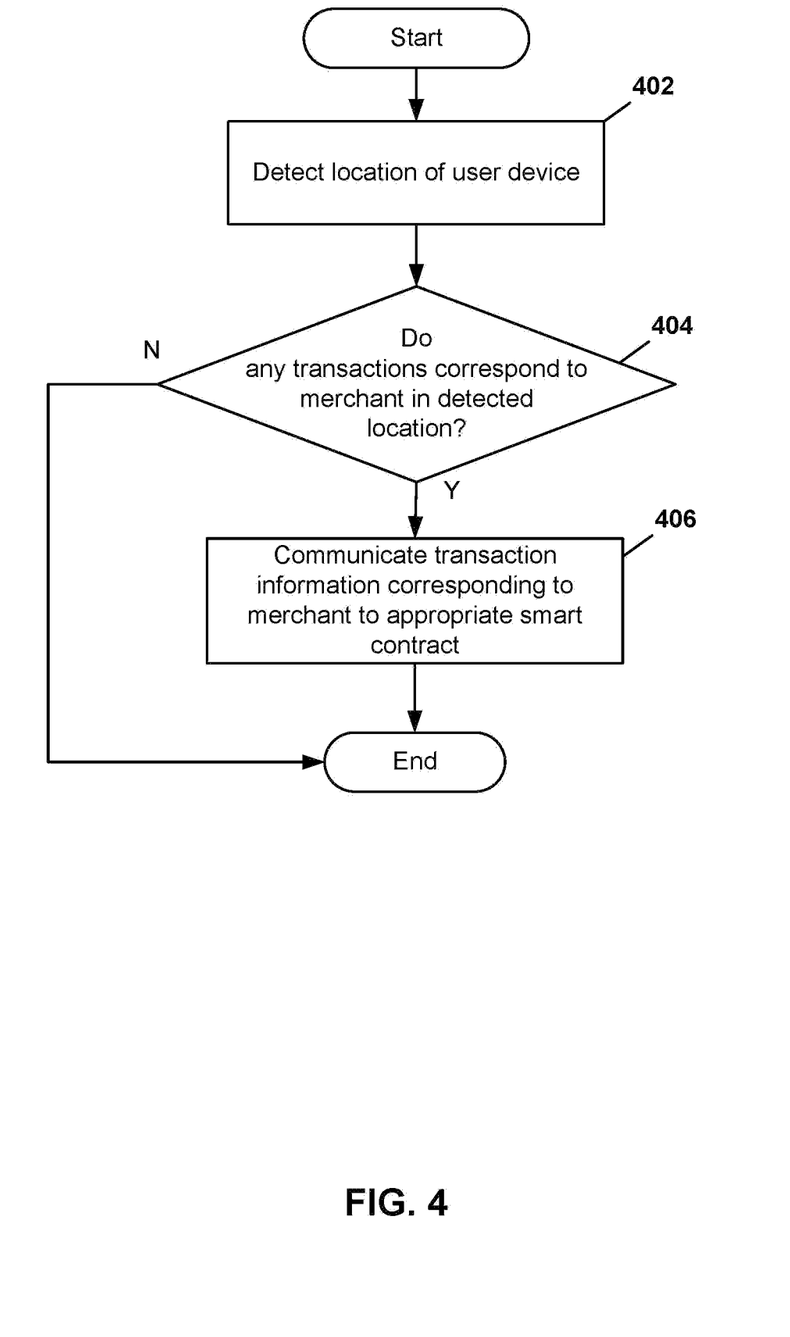
FIG. 4 is a flowchart illustrating the operations of the server-side transaction application of FIG. 1 in causing rewards information on a blockchain to be updated based on detected location information, in accordance with an embodiment.

FIG. 4 is a flowchart illustrating the operations of transaction application 112 in causing rewards information on a blockchain to be updated based on detected location information, in accordance with an embodiment. In the example embodiment, transaction application 112 detects the location of user device 150 (step 402). In one or more embodiments, transaction application 112 may detect the location of user device 150 by communicating with a beacon device located in the vicinity of transaction application 112 (for example a beacon located in a merchant location visited by the user of user device 150), by communicating with a GPS module associated with user device 150, by communicating with merchant device 140 (for example, receiving location information when transaction is initiated at merchant POS), or by utilizing other known means.

In the example embodiment, transaction application 112 determines whether any previously completed transactions, which have not been communicated to an appropriate smart contract of smart contracts 122, correspond to a merchant in the detected location (decision 404). In the example embodiment, transaction application 112 may aggregate transactions and further categorize the transactions based on the associated merchant. Upon, either satisfying certain requirements (as discussed in FIG. 3), or upon detected a user location within a merchant location, the transactions may be communicated to the appropriate smart contract so that rewards may be allocated. Therefore, in this decision step, transaction application 112 may reference all previously completed transactions which have not been communicated to the appropriate smart contract, and identify if any of the previously completed transactions (which have not been communicated to the appropriate smart contract) correspond to a merchant in the detected location of user device 150. If transaction application 112 determines that no previously completed transactions, which have not been communicated to an appropriate smart contract of smart contracts 122, correspond to a merchant in the detected location (decision 404, "NO" branch), transaction application 112 continues to monitor the location of user device 150.

If transaction application 112 determines that one or more previously completed transactions, which have not been communicated to an appropriate smart contract of smart contracts 122, correspond to a merchant in the detected location (decision 404, "YES" branch), transaction application 112 identifies an appropriate smart contract of smart contracts 122, and further communicates transaction information corresponding to the one or more previously completed transactions that correspond to the merchant in the detected location to the appropriate smart contract. In the example embodiment, communicating the transaction information to the appropriate smart contract causes an amount of rewards to be allocated to an account of the user of user device 150 (the amount determined based on the transactional amount, volume, frequency, detected location of the user, etc., as discussed above). Furthermore, the transaction information and/or the allocated rewards amount may be written onto the appropriate blockchain (blockchain nodes 120).

Figure 5:
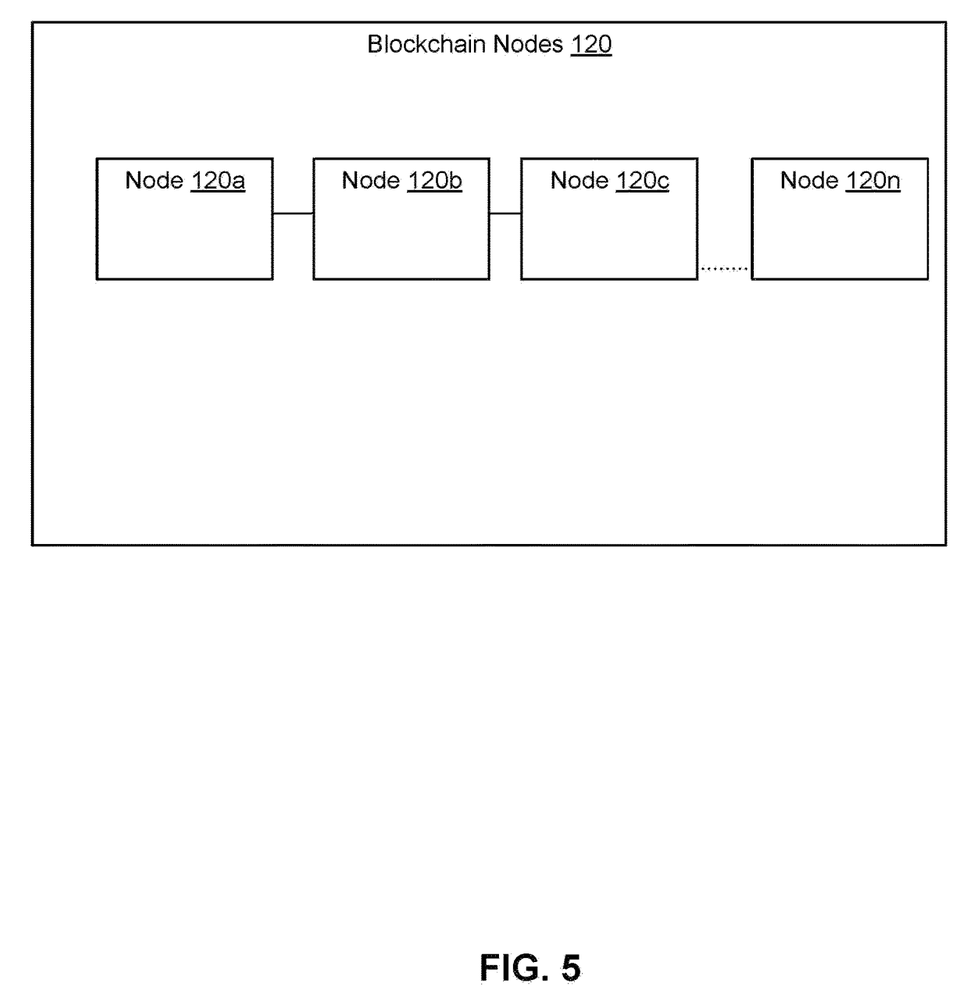
FIG. 5 is an illustration of the blockchain nodes of FIG. 1, in accordance with an embodiment.

FIG. 5 is an illustration of blockchain nodes 120, in accordance with an embodiment. In the example embodiment, blockchain nodes 120 represent the nodes that support and store information corresponding to one or more blockchains. In the example embodiment, blockchain nodes 120 may include node 120*a*, 120*b*, 120*c* to 120*n*. This group of nodes may represent the nodes that support a particular blockchain. In other words, each of these nodes is a computing device that stores a copy of the ledger file that corresponds to the particular blockchain, and further supports the updating of the ledger file as transactions are performed.

In other embodiments, rather than transaction application 112 serving as a transaction application and a transaction platform for buying, selling, and/or exchanging rewards, transaction application 112 may communicate with a separate transaction platform to identify whether specific rewards are available and further to identify a transaction path for obtaining the specific rewards.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 6:
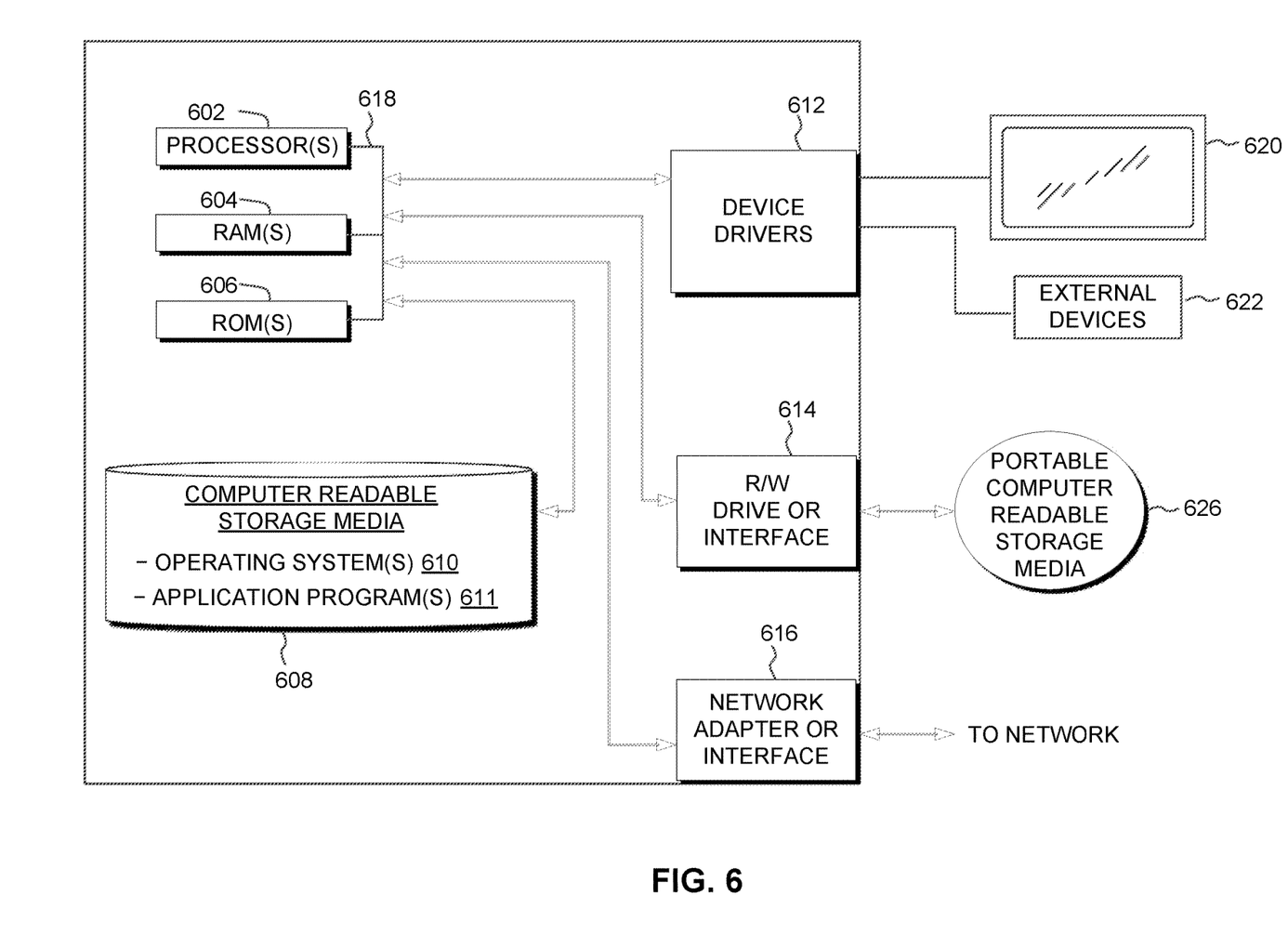
FIG. 6 is a block diagram depicting the hardware components of the loyalty marketplace system of FIG. 1, in accordance with an embodiment.

FIG. 6 depicts a block diagram of components of computing devices contained in loyalty marketplace system 100 of FIG. 1, in accordance with an embodiment. It should be appreciated that FIG. 6 provides only an illustration of one implementation and does not imply any limitations with regard to the environments in which different embodiments may be implemented. Many modifications to the depicted environment may be made.

Computing devices may include one or more processors 602, one or more computer-readable RAMs 604, one or more computer-readable ROMs 606, one or more computer readable storage media 608, device drivers 612, read/write drive or interface 614, network adapter or interface 616, all interconnected over a communications fabric 618. Communications fabric 618 may be implemented with any architecture designed for passing data and/or control information between processors (such as microprocessors, communications and network processors, etc.), system memory, peripheral devices, and any other hardware components within a system.

One or more operating systems 610, and one or more application programs 611, for example, transaction application 112, are stored on one or more of the computer readable storage media 608 for execution by one or more of the processors 602 and by utilizing one or more of the respective RAMs 604 (which typically include cache memory). In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 614 to read from and write to one or more portable computer readable storage media 626. Application programs 611 on the computing devices may be stored on one or more of the portable computer readable storage media 626, read via the respective R/W drive or interface 614 and loaded into the respective computer readable storage media 608.

Computing devices may also include a network adapter or interface 616, such as a TCP/IP adapter card or wireless communication adapter (such as a 4G wireless communication adapter using OFDMA technology). Application programs 611 on the computing devices may be downloaded to the computing devices from an external computer or external storage device via a network (for example, the Internet, a local area network or other wide area network or wireless network) and network adapter or interface 616. From the network adapter or interface 616, the programs may be loaded onto computer readable storage media 608. The network may comprise copper wires, optical fibers, wireless transmission, routers, firewalls, switches, gateway computers and/or edge servers.

Computing devices may also include a display screen 620, and external devices 622, which may include, for example a keyboard, a computer mouse and/or touchpad. Device drivers 612 interface to display screen 620 for imaging, to external devices 622, and/or to display screen 620 for pressure sensing of alphanumeric character entry and user selections. The device drivers 612, R/W drive or interface 614 and network adapter or interface 616 may comprise hardware and software (stored on computer readable storage media 608 and/or ROM 606).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
a non-transitory memory; and
one or more hardware processors coupled to the non-transitory memory and configured to read instructions from the non-transitory memory to cause the system to perform operations comprising:
 detecting that a location of a user device corresponds to a merchant;
 in response to the detecting that the location of the user device corresponds to the merchant, determining one or more previously completed transactions of a plurality of previously completed transactions that have unprocessed rewards corresponding to the merchant;
 identifying a smart contract from a plurality of smart contracts that corresponds to the merchant and a user account being accessed by the user device;
 communicating transaction information corresponding to the one or more previously completed transactions to the identified smart contract, wherein the transaction information includes an amount of unprocessed rewards corresponding to the one or more previously completed transactions at the merchant;
 initiating, at the location of the merchant, processing of a transaction corresponding to the merchant and the user account being accessed by the user device;
 causing the smart contract to allocate, to the user account, a first amount of rewards in the smart contract;

detecting, by communicating with a beacon at the merchant and during the processing of the transaction, that locations of other user devices correspond to the merchant;

identifying, during the processing of the transaction, a second smart contract from the plurality of smart contracts that corresponds to one or more second merchants, wherein the plurality of smart contracts are accessible by user accounts of the other user devices at the locations that correspond to the merchant and a second amount of rewards in the second smart contract dynamically varies with a number of the other user devices at the locations that correspond to the merchant;

causing, during the processing of the transaction, the identified second smart contract to allocate, to the user account, the second amount of rewards; and processing the transaction using the first amount of rewards and the second amount of rewards in the user account.

2. The system of claim 1, wherein the one or more previously completed transactions corresponds to one or more purchases made by the user account at the merchant.

3. The system of claim 2, wherein the amount of unprocessed rewards corresponds to the one or more purchases made by the user account at the merchant.

4. The system of claim 3, further comprising allocating, on the smart contract, the amount of the unprocessed rewards corresponding to the one or more purchases, wherein the amount of the unprocessed rewards is allocated to the user account for the merchant.

5. The system of claim 1, wherein the operations further comprise:

processing a second transaction corresponding to the one or more second merchants and the user account being accessed by the user device; and in response to processing the second transaction, aggregating the second transaction with a set of previously completed transactions, wherein the set of previously completed transactions correspond to the one or more second merchants and the user account being accessed by the user device.

6. The system of claim 5, wherein the operations further comprise:

determining that a transactional monetary amount corresponding to the set of previously completed transactions exceeds a threshold monetary amount; and when the transactional monetary amount corresponding to the set of previously completed transactions exceeds the threshold monetary amount:

identifying a third smart contract from the plurality of smart contracts that corresponds to the one or more second merchants and the user account being accessed by the user device; and allocating, on the third smart contract, an amount of rewards corresponding to the set of previously completed transactions.

7. The system of claim 5, wherein the operations further comprise:

determining that a transactional volume corresponding to the set of previously completed transactions exceeds a threshold volume; and in response to determining that the transactional volume corresponding to the set of previously completed transactions exceeds the threshold volume:

identifying a third smart contract from the plurality of smart contracts that corresponds to the one or more second merchants and the user account accessed by the user device; and allocating, on the third smart contract, an amount of rewards that corresponds to the set of previously completed transactions.

8. The system of claim 1, wherein the identified smart contract includes logic that determines the amount of unprocessed rewards for the one or more previously completed transactions based on at least one of transactional monetary amounts of the one or more previously completed transactions, a volume of the one or more previously completed transactions, a frequency of the one or more previously completed transactions, or one or more time periods associated with the one or more previously completed transactions.

9. The system of claim 1, wherein the identified smart contract is located on a blockchain.

10. A method comprising:

in response to detecting that a location of a user device corresponds to a merchant, determining that one or more transactions previously completed at the merchant by a user account being accessed by the user device have unprocessed rewards;

identifying, in response to determining that the one or more transactions previously completed at the merchant by the user account being accessed by the user device have the unprocessed rewards, a smart contract, from a plurality of smart contracts, that corresponds to the merchant and the user account;

causing the identified smart contract to allocate, to the user account, an amount of the unprocessed rewards that corresponds to the one or more transactions previously completed at the merchant;

initiating processing of a transaction corresponding to the merchant and the user account being accessed by the user device;

detecting, by communicating with a beacon at the merchant, that location of other user devices corresponds to the merchant;

identifying, during the processing of the transaction, a second smart contract from the plurality of smart contracts that correspond to a second merchant, wherein the plurality of smart contracts are accessible by user accounts of the other user devices at the location that corresponds to the merchant and wherein a second amount of unprocessed rewards in the second smart contract dynamically changes with a number of the other user devices at the location that corresponds to the merchant; and causing, during the processing of the transaction, the identified second smart contract to allocate, to the user account, the second amount of unprocessed rewards that corresponds to a second one or more transactions previously completed at the second merchant; and completing the processing of the transaction using the amount of the unprocessed rewards and the second amount of unprocessed rewards in the user account.

11. The method of claim 10, wherein the one or more transactions previously completed at the merchant corresponds to one or more purchases made by the user account at the merchant.

12. The method of claim 11, wherein the amount of the unprocessed rewards corresponds to the one or more purchases made by the user account at the merchant.

13. The method of claim 10, wherein the amount of unprocessed rewards for the one or more transactions previously completed at the merchant by the user account based is determined based on at least one of transactional monetary amounts of the one or more transactions previously completed at the merchant, a volume of the one or more transactions previously completed at the merchant, a frequency of the one oi more transactions previously completed at the merchant, or one or more time periods associated with the one or more transactions previously completed at the merchant.

14. The method of claim 10, wherein the identified smart contract is located on a blockchain.

15. A non-transitory machine-readable medium having stored thereon machine-readable instructions executable to cause a machine to perform operations comprising:
- detecting that a location of a user device corresponds to a merchant;
- in response to the detecting that the location of the user device corresponds to the merchant, determining one or more previously completed transactions of a plurality of previously completed transactions that have unprocessed rewards corresponding to the merchant;
- identifying, in response to determining the one or more previously completed transactions correspond to the merchant, a smart contract, from a plurality of smart contracts, that corresponds to the merchant and a user account being accessed by the user device;
- communicating transaction information corresponding to the one or more previously completed transactions to the identified smart contract, wherein the transaction information includes an amount of unprocessed rewards corresponding to the one or more previously completed transactions at the merchant;
- processing a transaction at the location that corresponds to the merchant;
- during the processing of the transaction, detecting, using communications between other user devices and a device of the merchant, that the other user devices are at the location that corresponds to the merchant;
- during the processing of the transaction, identifying a second smart contract from the plurality of smart contracts that corresponds to a second merchant, wherein the plurality of smart contracts are accessible by user accounts of the other user devices at the location that corresponds to the merchant; and
- causing the identified first smart contract to allocate, to the user account, the amount of unprocessed rewards and the second smart contract to allocate, to the user account, a second amount of unprocessed rewards that corresponds to a second one or more transactions previously completed at the second merchant, wherein the second amount of rewards in the second smart contract dynamically changes with a number of the other user devices at the location that corresponds to the merchant during the processing of the transaction, wherein the amount and the second amount of the unprocessed rewards are processed in the transaction.

16. The non-transitory machine-readable medium of claim 15, wherein the one or more previously completed transactions corresponds to one or more purchases made by the user account at the merchant, and wherein the transaction information includes the amount of the unprocessed rewards corresponding to the one or more purchases made by the user account at the merchant.

17. The non-transitory machine-readable medium of claim 16, wherein the operations further comprise:
- allocating, on the smart contract, the amount of the unprocessed rewards corresponding to the one or more purchases, wherein the amount of the unprocessed rewards is allocated to the user account for the merchant.

18. The non-transitory machine-readable medium of claim 15, wherein the merchant is a first merchant, and wherein the operations further comprise:
- processing a second transaction corresponding to the second merchant and the user account being accessed by the user device; and
- in response to processing the second transaction, aggregating the second transaction with a first set of previously completed transactions of the plurality of previously completed transactions, wherein the first set of previously completed transactions correspond to the second merchant and the user account being accessed by the user device.

19. The non-transitory machine-readable medium of claim 18, wherein the smart contract is a first smart contract, and wherein the operations further comprise:
- determining that a transactional monetary amount corresponding to the first set of previously completed transactions exceeds a threshold monetary amount; and
- in response to determining that the transactional monetary amount corresponding to the first set of previously completed transactions exceeds the threshold monetary amount:
  - identifying the second smart contract, from the plurality of smart contracts, that corresponds to the second merchant and the user account being accessed by the user device; and
  - allocating, on the second smart contract, an amount of rewards corresponding to the first set of previously completed transactions.

20. The non-transitory machine-readable medium of claim 18, wherein the smart contract is a first smart contract, and wherein the operations further comprise:
- determining that a transactional volume corresponding to the first set of previously completed transactions exceeds a threshold volume; and
- in response to determining that the transactional volume corresponding to the first set of previously completed transactions exceeds the threshold volume:
  - identifying the second smart contract, from the plurality of smart contracts, that corresponds to the second merchant and the user account accessed by the user device; and
  - allocating, on the second smart contract, an amount of rewards that corresponds to the first set of previously completed transactions.

* * * * *

UNITED STATES PATENT AND TRADEMARK OFFICE
CERTIFICATE OF CORRECTION

| | |
|---|---|
| PATENT NO. | : 11,922,452 B2 |
| APPLICATION NO. | : 17/461822 |
| DATED | : March 5, 2024 |
| INVENTOR(S) | : Zachary Joseph Berman |

It is certified that error appears in the above-identified patent and that said Letters Patent is hereby corrected as shown below:

In the Claims

In Claim 13, Column 15, Line 8, change "of the one oi more" to --of the one or more--

Signed and Sealed this
Seventeenth Day of September, 2024

Katherine Kelly Vidal
*Director of the United States Patent and Trademark Office*